US012800760B2

(12) United States Patent
Lu et al.

(10) Patent No.: US 12,800,760 B2
(45) Date of Patent: Nov. 17, 2026

(54) METHOD AND APPARATUS FOR DETERMINATION OF DIRECTION OF ARRIVAL ANGLE

(71) Applicant: NXP B.V., Eindhoven (NL)

(72) Inventors: Yiting Lu, Delft (NL); Arie Geert Cornelis Koppelaar, Giessen (NL); Marco Jan Gerrit Bekooij, Empel (NL)

(73) Assignee: NXP B.V., Eindhoven (NL)

( * ) Notice: Subject to any disclaimer, the term of this patent is extended or adjusted under 35 U.S.C. 154(b) by 522 days.

(21) Appl. No.: 18/479,861

(22) Filed: Oct. 3, 2023

(65) Prior Publication Data

US 2024/0142617 A1 May 2, 2024

(30) Foreign Application Priority Data

Oct. 6, 2022 (EP) .................................... 22200091

(51) Int. Cl.
*G01S 15/42* (2006.01)
*G01S 7/03* (2006.01)
(Continued)

(52) U.S. Cl.
CPC ................ *G01S 15/42* (2013.01); *G01S 7/03* (2013.01); *G01S 7/356* (2021.05); *G01S 7/41* (2013.01);
(Continued)

(58) Field of Classification Search
CPC . G01S 15/42; G01S 7/03; G01S 7/356; G01S 13/006; G01S 13/42; G01S 13/584; G01S 13/34; G01S 7/41; G01S 13/88
See application file for complete search history.

(56) References Cited

U.S. PATENT DOCUMENTS 5,469,169 A * 11/1995 Frush .................... G01S 13/951 342/460
9,910,150 B2 3/2018 Schoor et al.
(Continued)

FOREIGN PATENT DOCUMENTS

DE 102012105582 A1 1/2013

OTHER PUBLICATIONS

Cho, Y., "Performance Analysis of Two-Dimensional Maximum Likelihood Direction-of-Arrival Estimation Algorithm Using the UCA", Hindawi International Journal of Antennas and Propagation, vol. 2017, Article ID 6926825, 28 pages, https://doi.org/10.1155/2017/6926825, Feb. 9, 2017.
(Continued)

*Primary Examiner* — Farhana A Hoque
*Assistant Examiner* — Joseph O Nyamogo

(57) ABSTRACT

An apparatus comprising a processor configured to receive an input dataset of radar signals received at a plurality of antenna elements that are arranged in a first plane; define a matrix of beamsteering vectors each representing an expected response at the antenna elements of the radar signals from the respective target and comprising a function of a first direction of arrival, DoA, angle θ, relative to the plurality of antenna elements, and a second DoA angle Φ, wherein the first DoA angle comprises a function of an elevation angle and the second DoA angle comprises an azimuth angle to the respective target, wherein the azimuth angle lies in a second plane that is arranged perpendicular to the first plane; define an objective function; search for a set of the first and second DoA angles for each of the plurality of targets by the repeated evaluation of the objective function.

18 Claims, 3 Drawing Sheets

(51) Int. Cl.

| | |
|---|---|
| ***G01S 7/35*** | (2006.01) |
| ***G01S 7/41*** | (2006.01) |
| ***G01S 13/34*** | (2006.01) |
| ***G01S 13/42*** | (2006.01) |
| ***G01S 13/58*** | (2006.01) |
| ***G01S 13/88*** | (2006.01) |

(52) U.S. Cl.

CPC .............. *G01S 13/34* (2013.01); *G01S 13/42* (2013.01); *G01S 13/584* (2013.01); *G01S 13/88* (2013.01)

(56) References Cited

U.S. PATENT DOCUMENTS

| | | | | |
|---|---|---|---|---|
| 2007/0273576 | A1* | 11/2007 | Struckman | G01S 3/146 342/146 |
| 2010/0066592 | A1* | 3/2010 | Lee | G01S 7/4021 342/175 |
| 2015/0185316 | A1* | 7/2015 | Rao | G01S 13/931 342/146 |
| 2017/0248692 | A1* | 8/2017 | Zivkovic | G01S 7/352 |
| 2018/0329709 | A1 | 11/2018 | Meinl | |
| 2021/0239788 | A1* | 8/2021 | Arage | G01S 7/032 |
| 2023/0152435 | A1 | 5/2023 | Koppelaar et al. | |

OTHER PUBLICATIONS

Hacker, P., “Single snapshot DoA estimation”, Advances in Radio Science, 8, pp. 251-256, Oct. 2010.

Heidenreich, P., “Antenna Array Processing: Autocalibration and Fast High-Resolution Methods for Automotive Radar”, Ph.D. Thesis, TU Darmstadt, Jun. 2012.

Jian, C., “2-D DOA Estimation by Minimum-Redundancy Linear Array”, 2006 8th International Conference on Signal Processing, Nov. 16-20, 2006.

Kim, E., “Efficient implementation of the ML estimator for high-resolution angle estimation in an unmanned ground vehicle”, IET Radar, Sonar & Navigation, Nov. 1, 2017.

Meinl, F., “Hardware Acceleration of Maximum-Likelihood Angle Estimation for Automotive MIMO Radars”, 2016 Conference on Design and Architectures for Signal and Image Processing (DASIP). IEEE, Oct. 12-14, 2016.

Stoica, P., “Maximum Likelhood Methods for Direction-of-Arrival Estimation”, IEEE Transactions on Acoustics, Speech, and Signal Processing, vol. 38. No. 7, Jul. 1990.

Wang, T., “Two-Dimension Direction-of-Arrival Estimation for Massive MIMO Systems”, IEEE Access, vol. 3., Nov. 2, 2015.

Wen, F., “Joint Azimuth, Elevation, and Delay Estimation for 3-D Indoor Localization”, IEEE Transactions on Vehicular Technology, vol. 67, No. 5, May 2018.

Xu, F., “Two-Dimensional DOA Estimation for L-shaped Nested Array via Tensor Modeling”, IEEE Transactions on Signal Processing, Apr. 14, 2021.

Zhang, F., “2-D DOA Estimation Method Based on Coprime Array MIMO Radar”, EURASIP Journal on Advances in Signal Processing, Aug. 18, 2021.

* cited by examiner

METHOD AND APPARATUS FOR DETERMINATION OF DIRECTION OF ARRIVAL ANGLE

CROSS-REFERENCE TO RELATED APPLICATIONS

This application claims the priority under 35 U.S.C. § 119 of European Patent application no. 22200091.1, filed on 6 Oct. 2022, the contents of which are incorporated by reference herein.

FIELD

The present disclosure relates to an apparatus and method for determining the directions of arrival angles for each of a plurality of targets in a dataset indicative of radar signals received at an antenna array. The disclosure also relates to a frequency-modulated-continuous-wave, FMCW, radar system configured to perform said method.

BACKGROUND

Deterministic Maximum-Likelihood (DML) Direction-of-Arrival (DoA) estimation is a technique for determination of the directions of arrival angles of component radar signals reflected from each of a plurality of targets in radar signals received at a plurality of antenna elements. The antenna elements may be part of a FMCW radar.

SUMMARY

According to a first aspect of the disclosure we disclose an apparatus comprising a processor configured to:

receive an input dataset, $\underline{x}$, indicative of radar signals received at a plurality of antenna elements that are arranged in a first plane in a two-dimensional array, wherein the radar signals have reflected from a plurality of targets;

define a matrix, A, formed of beamsteering vectors, $\underline{a}$, comprising one for each one of the plurality of targets, each beamsteering vector representing an expected response at the plurality of antenna elements of the radar signals from the respective target with a predetermined amplitude and comprising a function of a first direction of arrival, DoA, angle θ, relative to the plurality of antenna elements, and a second direction of arrival, DoA, angle Φ, relative to the plurality of antenna elements, wherein the first DoA angle comprises a function of an elevation angle to the respective target and the second DoA angle comprises an azimuth angle to the respective target, wherein the azimuth angle lies in a second plane that is arranged perpendicular to the first plane;

define a signal amplitude vector, $\underline{s}$, to represent expected complex amplitudes of each of the plurality of targets as received in the radar signals;

define an objective function based on $\underline{x}$, A and $\underline{s}$;

search for a set of the first and second DoA angles for each of the plurality of targets by the repeated evaluation of the objective function over points of a search space, each point corresponding to a different combination of the first DoA angle and the second DoA angle, wherein said set of the first and second DoA angles comprise those that provides one of a maximum and a minimum evaluation of the objective function over the search space.

In one or more embodiments, each of the beamsteering vectors are defined as:

$$\underline{a}_{k,l}^{T} = \left( e^{i2\pi\left(\frac{d_1}{\lambda}\right) sin\phi_k sin\theta_l + \left(\frac{L_1}{\lambda}\right) cos\theta_l}, \ldots , e^{i2\pi\left(\frac{d_N}{\lambda}\right) sin\phi_k sin\theta_l + \left(\frac{L_N}{\lambda}\right) cos\theta_l} \right)$$

wherein k and l are indices for stepping through the points in the search space that correspond to candidate first and second DoA angles respectively, $d_1$ to $d_N$ represent the spacing of respective ones of the plurality of antenna elements from a first reference antenna element of the plurality of antenna elements in a first direction, $L_1$ to $L_N$ represent the spacing of respective ones of the plurality of antenna elements from a second reference antenna element of the plurality of antenna elements in a second direction orthogonal to the first direction, λ represents the wavelength of the radar signals, $\theta_l$ comprises the first DoA angle at index l for a target of the plurality of targets, and $\Phi_k$ comprises the second DoA angle at index k for the target of the plurality of targets.

In one or more embodiments, the elevation angle to said target of the plurality of targets is measured from the second plane and wherein said function of the elevation angle comprises:

the first DoA angle $\theta_l$=90°−elevation angle.

In one or more embodiments, the points in the search space are arranged such that:

$\cos\theta_{l+1}-\cos\theta_l=\Delta$, wherein $\theta_l$ and $\theta_{l+1}$ are first DoA angles corresponding to all directly adjacent points in the search space and Δ comprises a first predetermined constant; and $$\sin \phi_{k+1} \sin \theta_l - \sin \phi_k \sin \theta_l \delta,$$

wherein $\Phi_k$ and $\Phi_{k+1}$ are second DoA angles corresponding to all directly adjacent points in the search space and δ comprises a second predetermined constant.

In one or more embodiments, each of the beamsteering vectors are defined as:

$$\underline{a}_{k,l}^{T} = \left( e^{i2\pi\left(\frac{d_1}{\lambda}\right).k.\delta + \left(\frac{L_1}{\lambda}\right).l.\Delta}, \ldots , e^{i2\pi\left(\frac{d_N}{\lambda}\right).k.\delta + \left(\frac{L_N}{\lambda}\right).l.\Delta} \right)$$

wherein k and l are indices for stepping through the points of the search space that correspond to candidate first and second DoA angles respectively for each respective beamsteering vector.

In one or more embodiments, the plurality of targets comprises two targets.

In one or more embodiments, for the search for two targets, the apparatus is configured to, prior to said search for the set of direction of arrival angles, determine a look up table, said look up table providing an evaluation of:

$$\alpha_{k,l,m,n} = \frac{1}{N}\left( \underline{a}_{n,m}^{H} \ \ \underline{a}_{k,l} \right) = \alpha_{k-n,l-m}$$

wherein $\underline{\alpha}_{k,l}$ comprises the beamsteering vector for a first target of the plurality of targets;

wherein $$\underline{a}_{n,m}^{H}$$

comprises a Hermitian of the beamsteering vector for a second target of the plurality of targets, wherein k and l represents indices for stepping through the points of the search space corresponding to the first DoA angle and the second DoA angle respectively for the first target, wherein n and m represents indices for stepping through the points of the search space corresponding to the first DoA angle and the second DoA angle respectively for the second target, and wherein values of $\alpha_{k,l,m,n}$ are recalled from the look up table for the different combinations of k, l, m and n during said search for the set of the first and second DoA angles for each of the two targets wherein said objective function includes the term $\alpha_{k,l,m,n}$.

In one or more embodiments, the objective function is based on Q, wherein $Q=|\underline{x}-A\underline{s}|^2$.

In one or more embodiments, the input dataset is Range-Doppler processed such that it is one or both of representative of one or more targets located at a predetermined range of distances from the antenna elements; and one or more targets having a predetermined range of radial velocities relative to the antenna elements.

In one or more embodiments, the apparatus comprises a frequency-modulated-continuous-wave, FMCW, radar system.

According to a second aspect of the disclosure we disclose a method for determining the directions of arrival angles for each of a plurality of targets, the method comprising:

receiving an input dataset, $\underline{x}$, indicative of radar signals received at a plurality of antenna elements that are arranged in a first plane in a two-dimensional array, wherein the radar signals have reflected from a plurality of targets;

defining a matrix, A, formed of beamsteering vectors, $\underline{a}$, comprising one for each one of the plurality of targets, each beamsteering vector representing an expected response at the plurality of antenna elements of the radar signals from the respective target with a predetermined amplitude and comprising a function of a first direction of arrival, DoA, angle θ, relative to the plurality of antenna elements, and a second direction of arrival, DoA, angle Φ, relative to the plurality of antenna elements, wherein the first DoA angle comprises a function of an elevation angle to the respective target and the second DoA angle comprises an azimuth angle to the respective target, wherein the azimuth angle lies in a second plane that is arranged perpendicular to the first plane;

defining a signal amplitude vector, $\underline{s}$, to represent expected complex amplitudes of each of the plurality of targets as received in the radar signals;

defining an objective function based on $\underline{x}$, A and $\underline{s}$;

searching for a set of the first and second DoA angles for each of the plurality of targets by the repeated evaluation of the objective function over points of a search space, each point corresponding to a different combination of the first DoA angle and the second DoA angle, wherein said set of the first and second DoA angles comprise those that provides one of a maximum and a minimum evaluation of the objective function over the search space.

In one or more embodiments, each of the beamsteering vectors are defined as:

$$\underline{a}_{k,l}^T = \left(e^{i2\pi\left(\frac{d_1}{\lambda}\right)\sin\phi_k\sin\theta_l+\left(\frac{L_1}{\lambda}\right)\cos\theta_l}, \ldots, e^{i2\pi\left(\frac{d_N}{\lambda}\right)\sin\phi_k\sin\theta_l+\left(\frac{L_N}{\lambda}\right)\cos\theta_l}\right)$$

wherein k and l are indices for stepping through the points in the search space that correspond to candidate first and second DoA angles respectively, $d_1$ to $d_N$ represent the spacing of respective ones of the plurality of antenna elements from a first reference antenna element of the plurality of antenna elements in a first direction, $L_1$ to $L_N$ represent the spacing of respective ones of the plurality of antenna elements from a second reference antenna element of the plurality of antenna elements in a second direction orthogonal to the first direction, λ represents the wavelength of the radar signals, $\theta_l$ comprises the first DoA angle at index l for a target of the plurality of targets, and $\Phi_k$ comprises the second DoA angle at index k for the target of the plurality of targets.

In one or more embodiments, the elevation angle to said target of the plurality of targets is measured from the second plane and wherein said function of the elevation angle comprises:

the first DoA angle $\theta_l$=90°−elevation angle.

In one or more embodiments, the points in the search space are arranged such that:

$\cos\theta_{l+1}-\cos\theta_l=\Delta$, wherein $\theta_l$ and $\theta_{l+1}$ are first DoA angles corresponding to all directly adjacent points in the search space and Δ comprises a first predetermined constant; and $$\sin\Phi_{k+1}\sin\theta_l-\sin\phi_k\sin\theta_l=\delta,$$

wherein $\Phi_k$ and $\Phi_{k+1}$ are second DoA angles corresponding to all directly adjacent points in the search space and δ comprises a second predetermined constant.

In one or more embodiments, each of the beamsteering vectors are defined as:

$$\underline{a}_{k,l}^T = \left(e^{i2\pi\left(\frac{d_1}{\lambda}\right)\cdot k\cdot\delta+\left(\frac{L_1}{\lambda}\right)\cdot l\cdot\Delta}, \ldots, e^{i2\pi\left(\frac{d_N}{\lambda}\right)\cdot k\cdot\delta+\left(\frac{L_N}{\lambda}\right)\cdot l\cdot\Delta}\right)$$

wherein k and l are indices for stepping through the points of the search space that correspond to candidate first and second DoA angles respectively for each respective beamsteering vector.

According to an aspect of the disclosure we provide a computer program product, such as a non-transitory computer program product comprising computer program code which, when executed by a processor of an apparatus causes the apparatus to perform the method of the second aspect.

In one or more examples, the apparatus may comprise at least one processor and at least one memory, wherein the memory stores the computer program and the processor is configured to execute said computer program.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
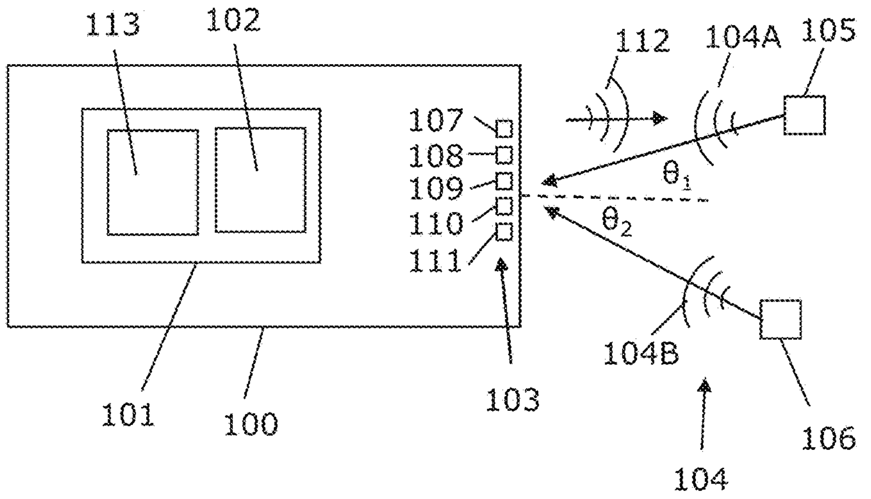
FIG. 1 shows an example embodiment of an apparatus and a FMCW system.

FIG. 1 shows an example embodiment of a FMCW system 100. The system comprises an apparatus 101, which may comprise a processor arrangement 102, for processing data indicative of radar signals 104 received by an antenna array 103. The radar signals 104 may comprise reflections from one or a plurality of targets 105, 106. The processor arrangement 102 may represent a processor and memory for execution of computer program code.

The antenna array 103 comprises a plurality of antenna elements 107-111. One or more of the antenna elements may be configured to transmit radar signals, which may comprise a FMCW chirp 112, that will reflect from the targets 105, 106. Two or more of the antenna elements 107-111 may be configured to receive the reflected radar signals 104A, 104B from the targets 105, 106. The processing performed by the processor arrangement 102 described herein is first described, for simplicity, for data received from the plurality of antenna elements when they are arranged in one dimensional line. Accordingly, only an azimuth angle may be determined. After this first description, the processing performed by the processor arrangement 102 is then described for data received from the plurality of antenna elements when arranged in two dimensional array, such that an azimuth and elevation angle to a target may be determined.

FMCW radar has many applications and may be used in the automotive field to detect targets in the neighbourhood of the vehicle with the objective to make driving safer and more comfortable. Distance to the target(s) 105, 106 and the relative velocity of the target(s) can be estimated. The use of several antenna elements 107-111 to transmit and receive radar signals allows for the direction in which this target is present to be determined and it is typically represented as an angle relative to a direction of the antenna elements.

The reflected radar signal 104A from the first target 105 has an direction of arrival angle of $\theta_1$ at the antenna elements 107-111. The reflected radar signal 104B from the second target 106 has a direction of arrival angle $\theta_2$ at the antenna elements 107-111. However, the radar signals 104 as received by the antenna elements 107-111 comprises a combination of the signals 104A and 104B and noise. It will also be appreciated that the direction of arrival angle may represents the angle of arrival of the reflected radar signals 104A, 104B in one or both of an azimuth angle and an elevation angle.

Accordingly, it is necessary to processes the received radar signals to determine, optionally, the number of targets (if not known or otherwise determined) and the direction of arrival angles $\theta_k$, which in this example comprise $\theta_1$ and $\theta_2$.

Deterministic Maximum-Likelihood (DML) Direction-of-Arrival (DoA) estimation is a known process for determining the most likely (including likely) angles from which the radar signals 104A, 104B are received to create the observed combination of radar signals 104 as received by the antenna elements 107-111.

The transmitted radar signals are reflected by the target(s) 105, 106 and received by the receive antenna elements of the radar system 100 and, depending on the direction of arrival angle of the reflected wave(s) $\theta_1$ and $\theta_2$, different path-lengths between transmit antenna element, targets 105, 106 and receive antenna elements are realised, leading to phase differences in the received radar signals between the antenna elements. Analysis of these phase differences is carried out to estimate the direction of arrival angle of the target(s).

Direction of arrival angle estimation based on data from the antenna array 103 is an important matter for radar systems 100. If the radar signals received originate from one target 105, the signal strength at the antenna elements 107-111 is identical but due to path length differences between antenna elements 107-111 and target 105 the phase of the radar signal will be different and is a function of the direction of arrival angle.

Figure 2:
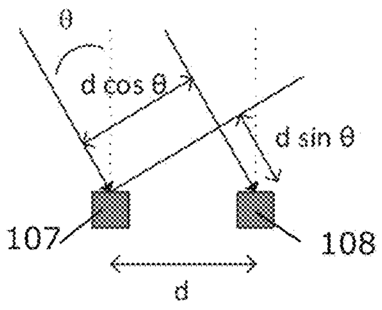
FIG. 2 shows an example embodiment of a pair of antenna elements illustrating a direction of arrival angle.

FIG. 2 shows two example antenna elements, which may comprise antenna elements 107 and 108 receiving the radar signal 104A. The path length difference is given by $d\sin\theta$ where d is the antenna element spacing and $\theta$ is the direction-of-arrival angle.

When multiple targets 105, 106 are reflecting, a linear combination of these signals will be received. Because of the linear combination, both the amplitude and the phase per antenna element 107-111 will vary and has to be used to estimate the DoA angles of the targets 105, 106.

In practice the number of targets 105, 106 is unknown and has to be estimated as well. In one or more examples, data from the antenna array 103 can be pre-processed to analyse the space in which the targets are located.

Using radar signals, such as FMCW radar signals, one can use the known technique of Range-Doppler processing to quantize the received signal in Range and Doppler shift. For each Range-Doppler combination for which one has detected energy (above a threshold), one can carry out the DoA estimation. The Range-Doppler pre-processing separates targets on the basis of their distance from the antenna array 103 and their radial velocity (Doppler) and therefore the number of targets per Range-Doppler bin are expected to be low. The properties of the FMCW signal determine how fine the radar scene is quantized in Range and Doppler. With an appropriate designed radar system it is reasonable to assume that having one target present in the radar data of one Range-Doppler bin is more likely than having two present in the radar data of one Range-Doppler bin, and 2 targets more likely than 3 targets etc. In one or more examples, therefore, an algorithm to solve the DoA problem may therefore start with searching first for only one target, then for two targets, then for three targets, etc. When each of these searches indicates how well the found candidate DoA's match with the received radar data signals then one can stop searching for more targets if the match with the received signal is sufficiently close (e.g. above a threshold level of confidence) . Noise in the radar system is a reason why an exact match is unlikely to happen. Since noise power is estimated in radar systems, a threshold may be derived to evaluate the match.

Deterministic Maximum Likelihood DoA estimation is a technique that for a given number of targets can determine what the most likely DoA angles are and what their match is to the received radar signal. In one or more examples, the DML algorithm may be configured to find the DoA angles that maximizes the match with the received radar data. In case a K-target search with DML finds a match that is too poor (e.g. below a threshold level of a match) on the basis of the known noise properties, then one proceeds with a (K+1)-target search with DML. A DML search for (K+1) targets is more complex than a search for K targets. Therefore, in a practical implementation one has to stop after a certain K because of limitations in computing resources to search for more targets. Moreover, system imperfections (amplitude and phase distortions, noise) also limits the number of targets one successfully can estimate. In one or more examples a practical value for K is therefore from 1 to 2 or 1 to 3 or 1 to 4 or 1 to 5 potential targets.

DoA estimation may be carried out for each Range-Doppler bin for which sufficient energy is detected. In a rich radar scene this means that DoA estimation may have to be carried out many times within a system cycle. For that reason it is important that the corresponding complexity of the DoA estimation process is low.

DoA estimation starts with the radar signals received at the antenna elements or, more particularly, the data representing the reflected radar signals received at the antenna elements 107-111. These signals can be represented collectively with an N-dimensional vector $\underline{x}=(x_1, \ldots, x_N)^T$, which is often called a snapshot, and wherein T stands for transpose, such that $\underline{x}$ is a column vector. The number of antenna elements is N. During a system cycle, radar signals received by the apparatus 101 may comprise data representative of the received signals at each of the antenna elements 107-111. In one or more examples, during a system cycle, radar signals received by the apparatus may comprise snapshots extracted from one or more Range-Doppler bins. In one or more examples, DoA estimation may be carried out only for those Range-Doppler bins that contain radar signals having an energy above a certain threshold. Thus, the following process can be performed on the data whether or not Range-Doppler processing has been performed.

A signal received from a target at DoA angle $\theta_1$ will result in a response at the antenna elements 107-111. That response has constant amplitude and a phase relation between the antenna elements that is specific for the DoA angle $\theta_1$ and the relative positions of the antenna elements 107-111. The response can be denoted with a vector: $\underline{a}_1=\underline{a}(\theta_1)$. When at least two antenna elements have a distance $\leq\lambda/2$, and the DoA angle θ may be between −90 and 90 degrees, any two single target responses will be different and therefore the DoA angle of a single target response can be unambiguously determined. For multiple, say K targets, the antenna response will be a linear combination of K single target responses, i.e.

$$\underline{x} = \sum_{k=1}^{K} s_k \underline{a}_k + \underline{n},$$

where $\underline{n}$ represents additive noise, and $s_k$ represent the complex amplitude of the targets and $\underline{x}$ represents an input dataset representing the radar signals received at the antenna elements 107-111, and $\underline{a}_k$ comprises a vector and comprises a function of the DoA, wherein $$\underline{a}_k^T = \left(e^{j2\pi(d_1/\lambda)\sin\theta_k}, e^{j2\pi(d_2/\lambda)\sin\theta_k}, \ldots, e^{j2\pi(d_N/\lambda)\sin\theta_k}\right)$$

and $(d_1, \ldots, d_N)$ are the relative positions of the antenna elements or virtual antenna elements. The vector $\underline{\alpha}_k$ carries the relative phase behaviour among the antenna elements due to pathlength difference of a planar wave originating from an angle $\theta_k$.

It will be appreciated that this representation of the vector (known as a beamsteering vector) holds for determination of only an azimuth or only an elevation angle and not both.

Figure 3:
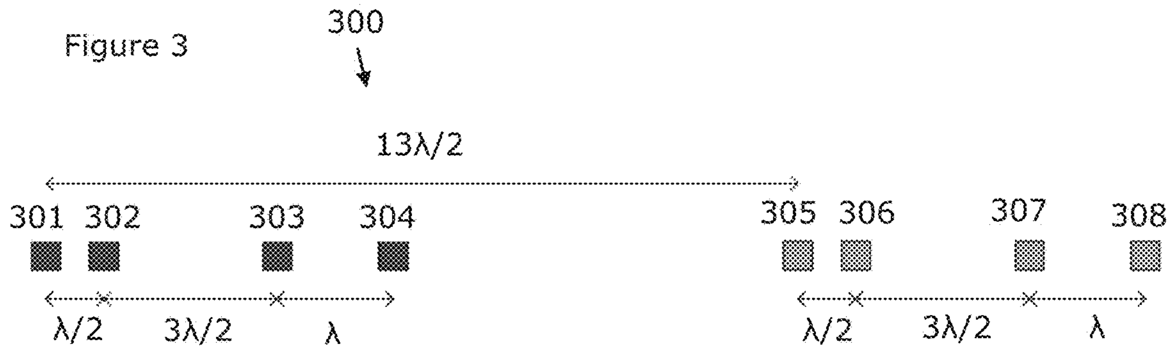
FIG. 3 shows an example embodiment of a plurality of antenna elements, wherein the antenna elements may be true antenna elements or virtual antenna elements or a combination.

FIG. 3 shows an example microstrip antenna array 300 with antenna elements 301-308 separated by distances d of different fractions of the operating wavelength. For example, the antenna array 300 may be configured to operate according to a MIMO scheme for which the positions of the two virtual antenna elements 301, 305 are indicative of the positions of the transmitters and are separated by 13 λ/2, and the virtual antenna elements 301, 302, 303, 303 are indicative of the receive array with antenna spacing (0, 1, 4, 6)λ/2, that in this specific example forms a Minimum Redundancy Array. Together they form a virtual antenna array with relative element positions $(d_1, \ldots, d_8)$=(0, 1, 4, 6, 13, 14, 17, 19)λ/2. Thus, in one or more examples, the antenna array 300 may comprise a combination of true and virtual antenna elements depending on the configuration of the antenna array. In other examples, the antenna array 300 may comprise all true antenna elements, i.e. the scenario in which the radar system will use one transmitter 301 antenna and eight receive antennas 301-308. Thus, the term antenna element can refer to true (real) antenna elements as well as virtual antenna elements.

The processing performed by the apparatus is based on the aforementioned input dataset. The input dataset may be from a Range-Doppler bin if the optional Range-Doppler processing is performed.

A more formal way to describe the linear combination of K single target responses is: $\underline{x}=A\underline{s}+\underline{n}$, where $\underline{s}$ collectively contains the K complex amplitudes $s_k$ of the targets, $\underline{n}$ represents additive noise, and the matrix A contains the K single target responses $\underline{a}_k$, for k=1, . . . , K.

For Additive White Gaussian Noise (AWGN), it is known that the K-target DML estimation can be summarized for finding the value of $\underline{s}$ and the matrix A that minimizes:

$$Q = \|\underline{x} - A\underline{s}\|_2^2$$

The value for $\underline{s}$ and the matrix A that minimizes Q, are called the maximum likelihood (ML) solutions. Wherein $$\| \ \|_2^2$$

represents a square of a 2-norm. For the DoA estimation problem, $\underline{s}$ is a side-product and the matrix A is the main output because its columns $\underline{a}$ can be uniquely linked to DoA angles θ.

A general description of DML-DoA determination will be provided followed by embodiments of the processing the example embodiment apparatus 100 is configured to perform.

Instead of jointly searching for the most likely $\underline{s}$ and the matrix A, an intermediate step may be carried out such that the search can be confined to the search for the most likely matrix A.

To simplify the search, it can be assumed that if one knows what the matrix A is, then given A and antenna response $\underline{x}$ then one can determine which value of $\underline{s}$ minimizes $Q=|\underline{x}-A\,\underline{s}|^2$. This is a mean-square error problem and its least square solution is given by $\hat{\underline{s}}=(A^HA)^{-1}A^H\underline{x}$, where superscript H means complex conjugate transpose. The matrix $(A^HA)^{-1}A^H$ is also known as the pseudoinverse or Moore-Penrose inverse and is then denoted by $A^+$. To complete the simplification, the solution is substituted back into the expression for Q:

$$Q=\underline{x}^H(I-A(A^HA)^{-1}A^H)\underline{x}=\underline{x}^H\underline{x}-\underline{x}^H(A(A^HA)^{-1}A^H)\underline{x}.$$

Hence, the K-target DML problem becomes the problem of finding the K-column matrix A that minimizes Q. The term $\underline{x}^H\underline{x}$ in the expression for Q stays constant for a given received antenna response, that is the input dataset $\underline{x}$ and can therefore be omitted in the search for the most likely matrix A.

Instead of minimizing objective function Q, one can equivalently perform a search with the aim of maximizing objective function f, wherein:

$$f=\underline{x}^H(A(A^HA)^{-1}A^H)\underline{x}.$$

f is therefore an alternative objective function (rather than Q) of the search for A.

f as a function of A for a given antenna response $\underline{x}$ has many local maxima. The search for the most likely matrix A, i.e. the one that maximizes f, may or may not be performed exhaustively.

Also, if we define B as $B=(A^HA)^{-1}$, and $\underline{y}=A^H\underline{x}$ so $\underline{y}^H=\underline{x}^HA$, f can be simplified to:

$$f=\underline{x}^H(A(A^HA)^{-1}A^H)\underline{x}=\underline{y}^H(A^HA)^{-1}\underline{y}=\underline{y}^HB\underline{y}$$

At this point let us define D as $(A^HA)$, such that $B=(A^HA)^{-1}=D^{-1}$.

With $F_k=\underline{\alpha}_k^H\underline{x}$, which comprises a steering vector correlated with the snapshot, we have for $\underline{y}$:

$$\underline{y}=\begin{bmatrix}F_k\\F_n\end{bmatrix}$$

It will be appreciated that y is a two component vector for a two-target search. Thus, in general, for K-target search y is a K-dimensional vector.

Another practical point of attention is that the DoA angles that lead to the formation of matrix A can have any value between −90 and 90 degrees. To limit the search space, the DoA search space may be quantized into $N_\theta$ discrete points in the range <−90, 90> degrees. Hence per target we consider $N_\theta$ DoA angles.

A further simplification to the search may be performed. In particular, to further reduce the search space one has to realize that the function f is symmetric, i.e. for K=2 targets, the evaluation of the DML objective function f with $A=[\underline{a}(\theta_1)\ \underline{a}(\theta_2)]$ provides the same result as using $A=[\underline{a}(\theta_2)\ \underline{a}(\theta_1)]$. Therefore, one can reduce the search space for K=2, with roughly a factor 2 without sacrificing the finding of the maximum. In general, for K targets, the search space can be limited to size $$N_K=\binom{N_\theta}{K}.$$

As an example, Tor $N_\theta=256$ and a search for K=2 targets, the search space has an approximate size of $2^{15}=32768$. Hence, the DML objective function f has to be evaluated $N_K$ times in order to find the K DoA angles that maximizes f.

As an example of a general DML algorithm, we provide the following summary:

- for $n=1:N_K$,
  - select $\theta_1, \theta_2, \ldots, \theta_K$ from DoA search space
  - form matrix $A=[a(\theta_1)\ a(\theta_2)\ \ldots\ a(\theta_K)]$, matrix has K columns and N rows
  - Calculate $A^HA$, where H means complex conjugate transpose (Hermitian). The result is a KxK matrix
  - Determine $B=(A^HA)^{-1}$, i.e. the inverse of $A^HA$
  - Premultiply B with A and postmultiply with $A^H$: $ABA^H=A\,(A^HA)^{-1}\,A^H$, this is an NxN matrix
  - Use the antenna response input dataset x to calculate $f=x^H(A(A^HA)^{-1}A^H)x$
  - During search keep track of maximum f so far and the corresponding DoA angles
- End The general DML algorithm suffers from a lot of intensive matrix operations per evaluation of the DML objective function for each point in the search space. Thus, with the DML process formulated as matrix algebra and with the use of a reasonably dense search space, it is clear that the process is computationally intensive.

In the summary above, the K-dimensional search is represented as a linear search. It will apparent to those skilled in the art that the K-dimensional search can also be represented as K nested for-loops. The matrix operations that makes DML computationally intensive would be carried out in the inner for-loop. The search space associated with the K nested for-loops has the same size as the linear search shown in the summary above, i.e. the search space has size $N_K$. In one or more examples, the complexity of the inner loop of the algorithm can be reduced if one confines to K=2 targets.

In one or more examples, the following known method may be performed to reduce the number of matrix operations in the inner loop. In this example, the same objective function f is calculated for all points in the direction-of-arrival search space, but the calculations are organized in a different way.

Firstly, it is observed that the DML objective function without loss of generality can be rewritten as $f=(\underline{x}^HA)(A^HA)^{-1}(A^H\underline{x})=(A^H\underline{x})^H(A^HA)^{-1}(A^H\underline{x})$.

Secondly it is observed that the $A^H\underline{x}$ is the correlation of the antenna response input dataset $\underline{x}$ with the complex conjugate of K single target responses, i.e. $A^H\underline{x}=(\underline{\alpha}^H(\theta_1)\underline{x}, \underline{\alpha}^H(\theta_2)\underline{x}, \ldots, \underline{\alpha}^H(\theta_K)\underline{x})^T$.

Thirdly, for K=2, the matrix $B=(A^HA)^{-1}$ can be calculated symbolically such that no matrix inversion has to be carried out in the inner loop. With $D=A^HA$ and with $A=[\underline{\alpha}(\theta_k)\underline{\alpha}(\theta_n)]$ and wherein it is noted that substitution in the matrix D of $\alpha_{k,n}=1/N(\underline{\alpha}^H(\theta_k)\underline{\alpha}(\theta_n))$ which is equal to $N\alpha_{k,n}=(\underline{\alpha}^H(\theta_k)\underline{\alpha}(\theta_n))$ and taking account that $\underline{a}_k^H\underline{a}_k=N$, we get $$D = (A^H A) = \begin{pmatrix} N & N\alpha_{k,n}^H \\ N\alpha_{k,n} & N \end{pmatrix}$$

And one obtains:

$$B = D^{-1} = (A^H A)^{-1} = \frac{1}{N(1 - |\alpha_{k,n}|^2)} \begin{pmatrix} 1 & -\alpha_{k,n}^H \\ -\alpha_{k,n} & 1 \end{pmatrix},$$

where $$\alpha_{k,n} = \frac{1}{N}(\underline{a}^H(\theta_k)\,\underline{a}(\theta_n)).$$

Note this is an in-product between 2 single target responses and results in complex scalar.

The objective function then becomes:

$$f = \frac{1}{N(1 - |a_{k,n}|^2)} \left(|F_k|^2 - 2\,\mathrm{Re}\{\alpha_{k,n} F_k F_n^*\} + |F_n|^2\right),$$

where Re{} means the real part.

Combining all aforementioned steps, one can summarize the general DML method as follows:

- For k=1:$N_\theta$
  - Select $\theta_k$, form $\underline{a}(\theta_k)$
  - For n=k+1:$N_\theta$,
    - Select $\theta_n$, form $\underline{a}(\theta_n)$
    - Calculate (or recall) $\alpha_{k,n} = (\underline{a}^H(\theta_k)\ \underline{a}(\theta_n))/N$
    - Calculate $F_k = \underline{a}^H(\theta_k)\ \underline{x}$ and $F_n = \underline{a}^H(\theta_n)\ \underline{x}$
    - Substitute the values for $\alpha_{k,n}$, $F_k$ and $F_n$ in the expression for the DML objective function.
    - $$f = \frac{1}{N(1 - |\alpha_{k,n}|^2)} (|F_k|^2 - 2\,\mathrm{Re}\{\alpha_{k,n} F_k F_n^*\} + |F_n|^2),$$ where Re{ } means the real part.
    - During search keep track of maximum f so far and the corresponding DoA angles
  - End
- End It will be appreciated that in this example, the search may be decomposed into two nested for-loops. One for-loop for each of the two DoA angles $\theta_1$ and $\theta_2$ the search is looking to identify.

Embodiments of the processes performed by the apparatus 100 will now be described. It will be appreciated that the method to reduce the number of (or remove) matrix operations in the inner loop may be implemented in the processes described below. It will also be appreciated that the formulation of $\underline{\hat{s}}$ and the quantization of the search space as described above may also be applied to the processes described below.

In one or more examples, the apparatus is configured to perform the DML DoA method over a search space in which said search space comprises a plurality of discrete direction of arrival angles having non-uniform spacing therebetween and wherein the spacing between the discrete angles of arrival comprises a function of $\sin(\theta_k)$ between −1 and +1 (or a smaller range if the apparatus is configured to operate over a smaller field of view) wherein $\theta_k$ is the direction of arrival angle relative to the plurality of antenna elements. Thus, it will be appreciated that directions of arrival that may be resolved vary between $\theta_k$=−90 and $\theta_k$=+90 degrees. In the beamsteering vectors $\underline{a}$, we may see for the individual vector elements the value $\sin(\theta_k)$ in the exponents. For $\theta_k$ between −90 and +90 degrees, the value $\sin(\theta)$ varies between −1 and +1. Instead of choosing $\theta_k$ uniformly between −90 and +90, the apparatus may be configured to select a discretized search space $z_k$ uniformly between −1 and +1. Corresponding $\theta_k$ can be determined using $\theta_k$=arcsin ($z_k$). Thus, $\theta_k$ has a relation with $z_k$ in that $\theta_k$=arcsin($z_k$) wherein $z_k$ may be uniformly distributed, but this means that $\theta_k$ is non-uniformly distributed.

It has been found that evaluating the objective function as part of the search over a search space that comprises a plurality of discrete angles of arrival having non-uniform spacing therebetween and wherein the spacing between the discrete angles of arrival comprises a function of $\sin(\theta_k)$ can, in one or more examples, be advantageous in terms of the angular resolution of scene from which the reflected radar signals are received. Thus, the angular spacing of the points in the search space, $\theta_k$, will be non-uniform, wherein $\theta_k$=arcsin(z), wherein z represents the discrete points of the search space.

To explain further, the angular resolution of a planar antenna array 103, 300 is non-uniform, wherein for targets right in front of the antenna array (broadside) the resolution is higher, while for targets at larger (positive or negative) angles the resolution is smaller. Therefore it is beneficial to use a non-uniform search space searching for the DoAs. A non-uniform grid may requires less discrete points without sacrificing resolution. In one or more examples, this may allow for $N_\theta$, the number of discrete points in the search space, to be chosen smaller than with a uniform search space. In one or more examples, the choice of a search space where the discrete points in the search space are related to the angles of arrival by a function of $\sin(\theta_k)$ has additional advantages in terms of the processing performed by the processor 102. A side-effect of choosing spacing $z_k$=$\sin(\theta_k)$ uniform between −1 and 1, is that the corresponding grid in terms of $\theta_k$ will be denser for small $|\theta_k|$ and coarser at large $|\theta_k|$. However, since the effective aperture of an array is linear with $\cos(\theta)$ (See FIG. 2), the non-uniform sampling of the search space is complementary aligned with the effective aperture.

To explain the advantages of the selection of the search space, some extra observations will be explained in order to appreciate why the processing advantages occur.

First of all, the calculation of $Y_k=\underline{a}^H(\theta_k)\underline{x}$ and $Y_n=\underline{a}^H(\theta_n)\underline{x}$ is essentially the "beam-forming" correlation result at angles $\theta_k$ and $\theta_n$. Therefore, $|Y_k|^2$ and $|Y_n|^2$ are equal to the values of the "beam-forming" spectrum evaluated at angles $\theta_k$ and $\theta_n$. The next observation is that the value $\alpha_{k,n}=(\underline{a}^H(\theta_k)\underline{a}(\theta_n))/N$ is an inner product (or dot product) between two ideal single target responses. Therefore, the DML objective function can be regarded as the sum of single target beam-forming spectra values that are corrected with a value that represents mutual influence of single target responses at the total antenna array response. E.g. when $\alpha_{k,n}$=0, the single target responses are orthogonal and the DML objective function simply becomes $$f = \frac{1}{N}(|Y_k|^2 + |Y_n|^2).$$

Also for K>2 targets, the evaluation of the DML objective function can be written as a part in which the contribution of K targets is accounted for independently and a second part in which the mutual influence of the K targets is accounted for. This mutual influence is then still described by the same $\alpha_{k,n}$. For example, for three targets k, m, n we have mutual influence $\alpha_{k,m}$, $\alpha_{k,n}$ and $\alpha_{m,n}$.

In the general DML method described above, the values $Y_k$, $Y_n$ and $\alpha_{k,n}$ are calculated in the search step and, in particular, in the inner loop thereof. The first computational reduction that can be achieved is to calculate these values, store them in a Look-up Table (LUT) and to fetch these values in the search step, such as in an inner loop thereof from the LUT for substitution in the DML objective function.

Since, the search for the DoAs is carried out over the discrete DoA search space, which can be considered to comprise a grid of size $N_\theta$, the LUT for $Y_k$ has size $N_\theta$ and the one for $\alpha_{k,n}$ has a gross size of $N_\theta^2$. Using the properties $\alpha_{k,n}=(\alpha_{n,k})^*$ and $\alpha_{k,k}=1$, the table size for $\alpha_{k,n}$ can be reduced to $\frac{1}{2}N_\theta(N_{74}-1)$.

In one or more examples, the number of the plurality of discrete angles of arrival in the search space comprises a power of two. Thus, $N_\theta$ is a power of 2 and may, in one or more examples, comprise 256 or at least 256.

With the search space defined such that the spacing between the discrete points in relation to the angles of arrival comprises a function of $\sin(\theta_k)$, the following advantages may, in one or more examples, be realised:

1. the values $Y_k$ may, in one or more examples, be calculated (computationally efficiently) by correlation using a Fast Fourier Transform (FFT) and
2. the values $\alpha_{k,n}$, may in one or more examples, be expressed as a function of (k−n), and hence provide for generation of a LUT for $\alpha_{k,n}$ that will have size $2N_\theta-1$.

In one or more examples, the apparatus 101 is configured to, prior to said search for the set of directions of arrival angles, determine a first look up table, said look up table providing an association between each of the points in the search space (which relate to the plurality of discrete DoA angles) of the search space and a function $Y_k$, wherein $Y_k=\underline{a}^H(\theta_k)\underline{x}$ and $\underline{a}^H(\theta_k)$ comprises a Hermitian transpose of the vector $\underline{a}$ for target k for a candidate direction of arrival angle $\theta_k$; and wherein said search comprises a step of retrieving one or more $Y_k$ values from the look up table for each of the targets being evaluated for evaluating an objective function that contains the expression:

$$f=(A^H\underline{x})^H(A^HA)^{-1}(A^H\underline{x})$$

and $Y_k$ comprises part of the evaluation of the term $(A^H\underline{x})$ of said objective function, f.

Thus, as an example, in a two target evaluation, K=2, the apparatus 100 is configured to retrieve two values from the first look up table, say for candidate angle $\theta_k$, $Y_k$ is retrieved and for the other candidate angle $\theta_n$, $Y_n$ is retrieved (i.e. two candidates angles are jointly evaluated in expression, f, comprising one candidate angle for the 1st target and one candidate angle for the 2nd target. Thus, $(Y_k, Y_n)^T$ comprises the evaluation of the term $(A^Hx)$. Hence it can be considered that $Y_k$ comprises part of the evaluation of $(A^H\underline{x})$, and $Y_n$ the other part of the evaluation of $(A^H\underline{x})$.

The first look up table thus provides an evaluation of the function $Y_k$ for each Direction of Arrival angle θ associated with the search space. To summarize, in the search step for the best DoA angle, for each target we consider $N_\theta$ possible values for the DoA angle. For each of the $N_\theta$ DoA angles, one can determine a vector $\underline{a}$ that represents the ideal (or normalized noise-less) response for a single target from that DoA angle. The evaluation of the DML objective function requires (among more calculations) the evaluation of $(A^H\underline{x})$, where A is constructed from K of these ideal responses. The calculation of $(A^H\underline{x})$, for a given radar signal x, can be determined for each of the $N_\theta$ candidate DoA angles. The $N_\theta$ calculations thus comprise the first look up table and, for example, the look up table will contain $N_\theta$ complex values, one complex value per candidate DoA angle.

In one or more examples, the first look up table also includes an evaluation of $|Y_k|^2$ for each point in the search space.

In one or more examples, the apparatus 100 is configured to determine $Y_k$ by performing a correlation comprising calculating an inner product between direction-of-arrival-angle vector $\underline{a}$ and the input dataset $\underline{x}$ to obtain a complex value expression, wherein the look up table comprises the evaluation of the complex value expression over the search space, that is for each discrete point in the search space.

In one or more examples, the apparatus 100 is configured to perform said correlation by Fourier transform, such as Fast Fourier Transform, FFT, or Discrete Fourier Transform, DFT.

In one or more examples, the apparatus 100 is configured to perform zero-valued entry insertion of the input dataset. In particular, zero-valued entries may be added to the input dataset, which may comprise a matrix or array, at positions such that the data indicative of the radar signal is spaced apart by the zero-values entries such that their arrangement in the input dataset matrix or array corresponds to the physical arrangement of the antenna elements from which the data is obtained. The zero-valued entry insertion of the input dataset may additionally or alternatively be performed to give the input dataset a desired size for the purposes of Fourier transform processing, which will be described below.

Thus, the apparatus 100 may be configured to insert zero-valued entries into the input dataset, wherein the number of entries (i.e. instances of data from the antenna elements) in the input data set, $\underline{x}$, is increased to a predetermined number of entries by adding zero-valued entries, the zero-valued entries added at positions in the input dataset relative to the data that is indicative of the radar signals received at the plurality of antenna elements such that the data indicative of the radar signals have positions in the input dataset that correspond to a physical arrangement of the antenna elements and the zero-valued entries have positions in the input dataset that correspond to one or more gaps between the physical arrangement of the antenna elements and, thereby, the number of zero-valued entries between any two consecutive instances of the data indicative of the radar signals represents the inter-antenna element spacing.

Figure 4:
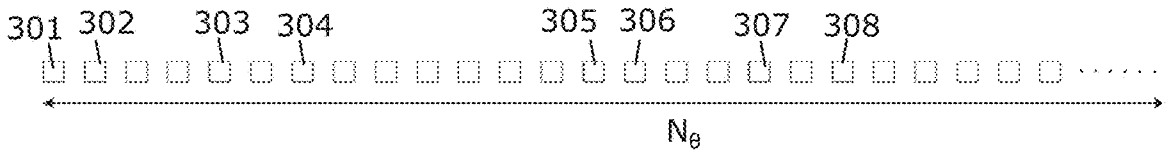
FIG. 4 shows an example embodiment of the same distribution of antenna elements as FIG. 3 but projected on a uniform grid with spacing between the antenna elements of $\lambda/2$.

FIG. 4 shows the same virtual antenna elements (including virtual antenna elements) projected on a uniform grid with antenna element spacings of λ/2. This projection shows how data representative of the radar signals extracted from the (virtual) antenna elements can be inserted in a vector of values that will be analysed using Fourier transform processing, such as FFT.

FIG. 4 also illustrates the generation of an zero-value inserted input dataset that has length $N_\theta$ wherein $N_\theta$ represents the number of discretized points of the search space. The zero-value inserted input dataset is thus derived from the input dataset indicative of the reflected radar signals received at the antenna elements 301-308 and includes said added zero-valued entries. The zero-valued insertion may be needed when we have a non-uniform linear antenna element array, i.e. the virtual antenna elements are at locations that are multiples of λ/2, but not at every multiple of λ/2 a virtual antenna is present as shown in FIG. 4. In example FIG. 4 we have antenna elements at positions {0, 1, 4, 6, 13, 14, 17, 19}×λ/2, Hence, there are no antenna elements present at positions {2, 3, 5, 7, 8, 9, 10, 11, 12, 15, 16, 18}×λ/2. It is at these positions that the zero-valued entries are inserted.

In one or more examples zero-value insertion may be performed to pad the input dataset to the predetermined number of entries by adding zero-valued entries in the input dataset at positions after the data indicative of the radar signals. Thus, the padding may be performed because we want to evaluate the objective function at $N_\theta$ direction-of-arrival angles. Using FFT for performing a correlation, one can do this efficiently by extending the input dataset (e.g. vector) $\underline{x}$ using zero-valued entries at the locations {20, 21, . . . , $N_\theta$−1}×λ/2.

In one or more examples, the predetermined number of entries in the input dataset, including any zero-valued entries, is configured to be substantially equal to the number of discrete points in the search space, $N_\theta$.

The correlation results $Y_k$ can be calculated with a DFT/FFT. In one or more examples, said Fourier transform by FFT or DFT is performed when the following conditions are met:

- the discrete points of the search space (i.e. the grid) for which the correlation results have to be calculated is uniform in sin(θ) and
- the antenna elements have spacings that are multiples of λ/2

Thus, looking to the vectors $\underline{a}_k$ the apparatus is configured to correlate with:

$$\underline{a}_k^T = \left(e^{j2\pi(d_1/\lambda)\sin\theta_k}, e^{j2\pi(d_2/\lambda)\sin\theta_k}, \ldots, e^{j2\pi(d_N/\lambda)\sin\theta_k}\right),$$

The $n^{th}$ component of this vector has an argument $\varphi_{k,n}$=2n ($d_n$/λ) sin $\theta_k$. As mentioned above, the search space for $\theta_k$ is chosen in such a fashion that the discrete points $z_k=\sin(\theta_k)$ is uniform between up to −1 and 1. We select $N_\theta$ discrete points of the search space and therefore $z_k$ can be written as $$z_k = \frac{2k}{N_\theta} \text{ for } k = -\frac{N_\theta}{2}, \ldots, \frac{N_\theta}{2} - 1$$

The antenna spacings $d_n$ are assumed to be multiples of λ/2, i.e. $d_n=m_n\lambda/2$, where $m_n$ is from a set of integers representing the virtual antenna locations, e.g. in our example of FIG. 4, we have $m_n \in$ {0, 1, 4, 6, 13, 14, 17, 19}. Substituting $d_n$ and $z_k$ in $\varphi_{k,n}$ results in:

$$\varphi_{k,n} = \frac{2\pi k m_n}{N_\theta}$$

Thus, it will be apparent to those skilled in the art that performing the correlation by DFT or FFT may be advantageous. In addition, the apparatus 100 may be configured to perform said zero-value entry insertion to extend 15 the input data set (e.g. a snapshot) vector with zeros. We define a vector $\underline{\tilde{x}}$ of length $N_\theta$: $\underline{\tilde{x}}=(\tilde{x}_0, \ldots, \tilde{x}_{N_\theta-1})^T$ and we substitute $\tilde{x}_{m_n}=x_n f$ or n=1 to N. At the other locations we substitute $\tilde{x}_m=0$ (this is an example of the zero-insertion and zero-padding described above). Now the apparatus 100 may be configured to determine $Y_k$ by DFT as $$Y_k = \underline{a}_k^H \underline{x} = \sum_{m=0}^{N_\theta-1} \tilde{x}_m \exp\left(-j\frac{2\pi km}{N_\theta}\right).$$

By choosing $N_\theta$ as a power of two, this correlation can be efficiently calculated using an FFT.

In one or more examples, the apparatus 100 is configured to, prior to said search for the set of directions of arrival angles, determine a second look up table, said second look up table providing an association between each of the candidate direction of arrival angles based on the discrete points of the search space for a plurality of targets, K, and $\alpha_{k,n}$, wherein $\alpha_{k,n}=(\underline{a}^H(\theta_k)\ \underline{a}(\theta_n))/N$ wherein $\underline{a}^H(\theta_k)$ comprises a Hermitian transpose of the vector $\underline{a}$ for a candidate direction of arrival angle $\theta_k$, $\underline{a}(\theta_n)$ comprises the vector for a different candidate direction of arrival angle $\theta_n$ for each target, wherein k and n represent indexes for stepping through the search space; and

- wherein said search comprises a step of retrieving $\alpha_{k,n}$ from the look up table for evaluating an objective function that contains the expression:

$$f=(A^H\underline{x})^H(A^HA)^{-1}(A^H\underline{x})$$

and wherein the term $(A^HA)^{-1}$ is determined based on $$(A^HA)^{-1} = \frac{1}{N(1-|a_{k,n}|^2)}\begin{pmatrix} 1 & -\alpha_{k,n}^* \\ -\alpha_{k,n} & 1 \end{pmatrix}.$$

In one or more examples, the apparatus 100 is configured to provide the second look up table based on the properties $\alpha_{k,n}=(\alpha_{n,k})^*$ and $\alpha_{k,k}=1$, such that the second look up table size for $\alpha_{k,n}$ is ½$N_\theta$($N_\theta$−1), wherein $N_\theta$ designates the number of discrete points in the search space.

In one or more examples, the apparatus 100 is configured to determine the values $\alpha_{k,n}$ of the second look-up table as a function of indices k and n, the function comprising k−n, and hence the second look up table for $\alpha_{k,n}$ will have size $N_\theta$ and that the mutual influence of 2 out of K targets can be captured in a coefficient that is a function of the difference of their corresponding indices.

As mentioned above, Range-Doppler processing may or may not be performed to arrive at the input dataset. Accordingly, in one or more examples, the apparatus 101 includes a Range-Doppler processing module 113 configured to separate antenna data from the antenna elements 107-111, 301-308 into one or more datasets, at least one of the one or more datasets representative of one or more targets and each dataset, relative to others of the one or more datasets, being representative of one or both of:

- different ranges from the antenna elements; and
- different radial velocities relative to the antenna elements;
  - wherein the antenna data comprises radar signals received at the plurality of antenna elements that have reflected from the plurality of targets, and wherein the input dataset, $\underline{x}$, comprises one of said one or more datasets separated by the Range-Doppler processing module 113.

Embodiments for Azimuth and Elevation Estimation

In the following description, the plurality of antenna elements 103 are arranged in a first plane in a two-dimensional array. The input dataset derived from such an arrangement of antenna elements may be used to derive an objective function for combined azimuth and elevation estimation.

Figure 5:
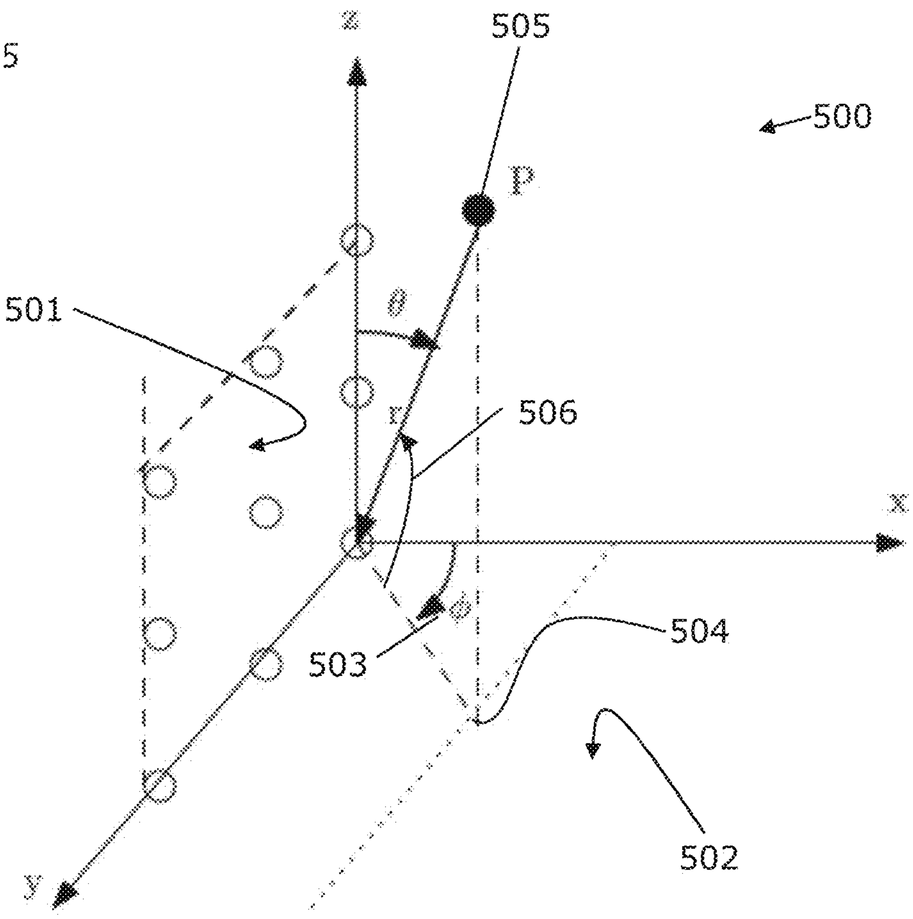
FIG. 5 shows an example definition of the space around the antenna elements.

Example FIG. 5 illustrates the definition of the azimuth angle and the elevation angle relative to the two-dimensional array of antenna elements. The definition of the azimuth angle and the elevation angle in this way has been found to be particularly advantageous in one or more embodiments, because the subsequent derivation of the beamsteering vectors has been found to lead to one or more computational efficiencies over other definitions of azimuth and elevation angle.

The definition of the space 500 around the antenna elements is as follows. The two-dimensional array of antenna elements 103 lies in the first plane 501, that is the y-z plane in this diagram. A second plane 502 is arranged perpendicular to the first plane 501 and, in this diagram, comprises the x-y plane. The azimuth angle 503 is measured in the second plane 502. That is the azimuth angle is measured between a line extending from the origin towards a projection 504 of a target 505 into the second plane 502 and the x-axis.

The elevation angle 506 is measured between the second plane 502 and a line toward the target 505 from the origin.

Figure 6:
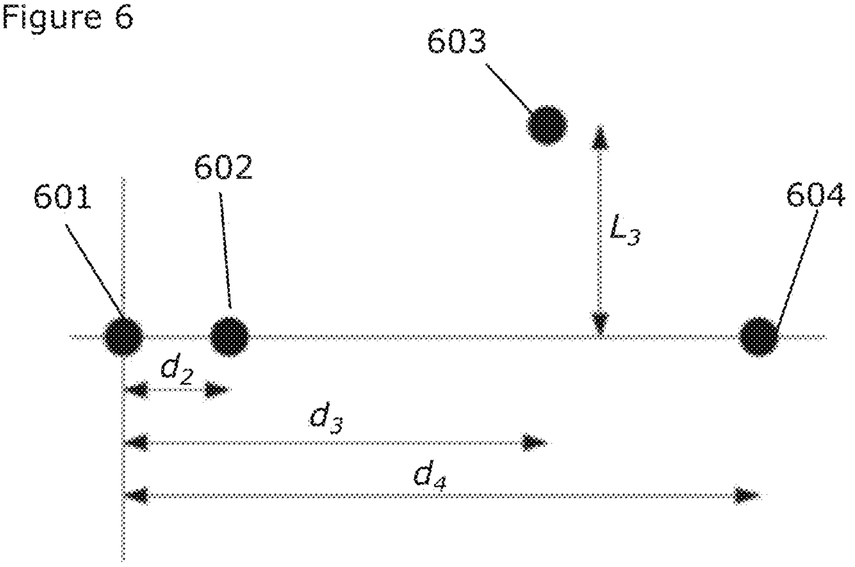
FIG. 6 shows an example two-dimensional antenna array.

FIG. 6 shows an example antenna array 600, and may comprise an example of the antenna array 103. As mentioned, this array lies in the first plane 501. A first antenna element 601, a second antenna element 602 and a fourth antenna element 604 are arranged along a first dimension. The first antenna element 601 forms a reference point such that the second antenna element is a distance $d_2$ from the reference point and the fourth antenna element is a distance $d_4$ from the reference point. A third antenna element 604 is arranged along a second dimension that is perpendicular to the first dimension. The third antenna element 603 is a distance $d_3$ from the first reference point and is a distance $L_3$ from a second reference point, comprising, in this example, the line, along the first dimension, through the first, second and fourth antenna elements (y-axis when considering FIG. 5).

For combined azimuth and elevation DoA estimation using the MLE algorithm, the un-optimized cost function remains exactly the same as for azimuth only estimation, that is:

$$f=\underline{x}^H(A(A^HA)^{-1}A^H)\underline{x}$$

However, the beamsteering matrix A now contains beamsteering vectors, one for each potential target, that are parameterized in two angles, wherein the two angles correspond to the azimuth and elevation angles.

We will assume a search for the azimuth and elevation angles for two targets for the following description. Thus, the matrix A expressed with the two beamsteering vectors for the candidate two targets comprises:

$$A=[\underline{\alpha}_{k,l},\underline{\alpha}_{n,m}]$$

It will be noted that the first beamsteering vector for the first target is associated with indices k and l for respectively stepping through the azimuth and elevation angles associated with points in the search space. Likewise, the second beamsteering vector for the second target is associated with indices n and m for respectively stepping through the azimuth and elevation angles associated with points in the search space.

Thus, the appartus is configured to define the beamsteering vectors in terms of two angles—a first direction of arrival, DoA, angle θ, relative to the plurality of antenna elements, and a second direction of arrival, DoA, angle Φ, relative to the plurality of antenna elements. The first DoA angle θ comprises a function (θ=90°−elevation angle) of the elevation angle shown in FIG. 5 to the respective target and the second DoA angle comprises an azimuth angle shown in FIG. 5 to the respective target. As mentioned, the azimuth angle lies in the second plane 502 that is arranged perpendicular to the first plane 501 and is measured from the x-axis, which extends normal to the 2-D array of antenna elements in first plane 501. The first DoA angle θ may be considered to be measured from extending vertically upwards from the antenna elements, i.e. the z-axis.

With a target P located at $(x_p, y_p, z_p)$ and $(x_a, y_a, z_a)$ the comprising the coordinates of the antenna elements, we can compute the distance to the target using:

$$\sqrt{(x_p-x_\alpha)^2+(y_p-y_\alpha)^2+(z_p-z_\alpha)^2}$$

The coordinates of the target, P, 505 in θ, Φ and r and given by:

$$z_p=r\cos\theta;\ x_p=r\cos\Phi\sin\theta;\ \text{and}\ y_p=r\sin\Phi\sin\theta.$$

After substitution in the equation above and simplifying using $\sin^2x+\cos^2x=1$ and twice simplifying using $\sin^2\alpha+\cos^2\alpha=1$ and $(\alpha-b)^2=\alpha^2+2\alpha b+b^2$ and an approximation that $y_\alpha$ and $z_\alpha$ are << r we determine that an increase in distance relative to the antenna elements from the origin is determined by $y_\alpha\sin\phi_k\sin\theta_l+z_\alpha\cos\theta_l$. After substitution of $d_1=y_a$ and $L_1=z_a$ where d and l represent the antenna element spacing in orthogonal directions, we obtain $d_1\sin\phi_k\sin\theta_l+L_1\cos\theta_l$.

Taking the first beamsteering vector as an example, each beamsteering vector (with substitution of respective indices) is thereby defined as:

$$\underline{a}_{k,l}^T=\left(e^{i2\pi\left(\frac{d_1}{\lambda}\right)\sin\phi_k\sin\theta_l+\left(\frac{L_1}{\lambda}\right)\cos\theta_l},\ \ldots,\ e^{i2\pi\left(\frac{d_N}{\lambda}\right)\sin\phi_k\sin\theta_l+\left(\frac{L_N}{\lambda}\right)\cos\theta_l}\right)$$

wherein k and l are indices for stepping through the points in the search space that correspond to candidate first and second DoA angles respectively, $d_1$ to $d_N$ represent the spacing of respective ones of the plurality of antenna elements from a first reference antenna element of the plurality of antenna elements in a first direction (see example FIG. 6), $L_1$ to $L_N$ represent the spacing of respective ones of the plurality of antenna elements from a second reference antenna element of the plurality of antenna elements in a second direction orthogonal to the first direction (see example FIG. 6), λ represents the operating wavelength of the radar signals, $\theta_l$ comprises the first DoA angle at index l for a target of the plurality of targets, and $\Phi_k$ comprises the second DoA angle at index k for the target of the plurality of targets. It will be appreciated that the second beamsteering vector is the same, but the indices l and k are replaced with n and m.

It has been found that the definition of the space around the two-dimensional array of antenna elements can be critical in the formulation of an objective function that is computationally efficient to process. The beamsteering vector specified above, which is established based on the definition of the space 500, has advantages because the first DoA angle and the second DoA angle are not mutually dependent.

As mentioned, the projection of the vector to point P from the origin to the vector in the x-y plane is derived using r cos(elevation). From this vector the projection on the y-axis follows as y=r cos(elevation) sin(azimuth). We define $\theta=90°-$elevation. Therefore r sin(elevation)=r $\cos(\theta)$ and y=r cos(elevation) sin(azimuth)=r $\sin(\theta)\sin(\Phi)$.

We will show later that these choices have as a consequence that the second DoA angle $\Phi$ and the first DoA angle $\theta$ are not mutually dependent but that we can derive the elevation or $\theta$ without knowledge of the azimuth angle or $\Phi$, and that only the derivation of the second DoA angle $\Phi$ requires knowledge of the first DoA angle $\theta$. Thus, given the present definitions there is no mutual dependency and this is advantageous.

Thus, in one or more examples, to derive the objective function again we define $D=A^H A$ and thus:

$$D=(A^H A)=\begin{bmatrix}\underline{a}_{k,l}^H\\ \underline{a}_{n,m}^H\end{bmatrix}\begin{bmatrix}\underline{a}_{k,l} & \underline{a}_{n,m}\end{bmatrix}=\begin{pmatrix}\underline{a}_{k,l}^H\underline{a}_{k,l} & \underline{a}_{k,l}^H\underline{a}_{n,m}\\ \underline{a}_{n,m}^H\underline{a}_{k,l} & \underline{a}_{n,m}^H\underline{a}_{n,m}\end{pmatrix}$$

Similar to the method above for azimuth only, we define $$\alpha_{k,l,m,n}=\frac{1}{N}(\underline{a}_{n,m}^H\ \ \underline{a}_{k,l})$$

$$\text{Then } \alpha_{k,l,m,n}^*=\frac{1}{N}(\underline{a}_{n,m}^H\ \ \underline{a}_{k,l})^H=\frac{1}{N}(\underline{a}_{k,l}^H\ \ \underline{a}_{n,m})$$

Substitution of $$\alpha_{k,l,n,m}=\frac{1}{N}(\underline{a}_{n,m}^H\ \ \underline{a}_{k,l}),$$

which is equal to $$N\alpha_{k,l,m,n}=(\underline{a}_{n,m}^H\ \ \underline{a}_{k,l}),$$

and taking into account that $$\underline{a}_{k,l}^H\underline{a}_{n,m}=N$$

we obtain the matrix D in the following format:

$$D=(A^H A)=\begin{pmatrix}N & N\alpha_{k,l,n,m}^*\\ N\alpha_{k,l,n,m} & N\end{pmatrix}$$

As a result:

$$B=(A^H A)^{-1}=D^{-1}=\frac{1}{N(1-|\alpha_{k,l,n,m}|^2)}\begin{pmatrix}1 & -\alpha_{k,l,n,m}^*\\ -\alpha_{k,l,n,m} & 1\end{pmatrix},$$

$f=\underline{x}^H(A(A^H A)^{-1}A^H)\underline{x}$ After substitution of B in the objective function $f=\underline{x}^H(A(A^H A)^{-1}A^H)\underline{x}$ and with some symbolic simplification we obtain the following objective function:

$$f=\frac{1}{N(1-|\alpha_{k,l,n,m}|^2)}\left(|y_{k,l}|^2-2\mathrm{Re}\{\alpha_{k,l,n,m}y_{k,l}y_{n,m}^*\}+|y_{n,m}|^2\right)$$

This is almost the same cost-function as for the azimuth only case. In the azimuth only description a second look up table is generated providing an association between each of the candidate direction of arrival angles based on the discrete points of the search space for a plurality of targets, K, and $\alpha_{k,n}$.

An important difference is that $\alpha_{k,l,n,m}$ is now a four-dimensional look up table instead of a two-dimensional look up table.

This table is typically impractically large because it has a size in the order of $G^2H^2$ elements with G the number of grid points in the search space in the azimuth direction and H the number of grid points in the elevation direction.

In one or more examples a further computational advantage may be obtained by configuring the spacing of the points in the search space.

In particular, the spacing is chosen such that $\alpha_{k,l,n,m}=\alpha_{k-n,l-m}$. It has been found that this allows us to reduce the size of the second look up table to $(2G-1)\times(2L-1)$ elements.

Thus, the points in the search space may be arranged such that:

$\cos\theta_{l+1}-\cos\theta_l=\Delta$, wherein $\theta_l$ and $\theta_{l+1}$ are first DoA angles corresponding to all directly adjacent points in the search space and $\Delta$ comprises a first predetermined constant; and $$\sin\phi_{k+1}\sin\theta_l-\sin\theta_k\sin\theta_l=\delta,$$

wherein $\Phi_k$ and $\Phi_{k+1}$ are second DoA angles corresponding to all directly adjacent points in the search space and $\delta$ comprises a second predetermined constant.

With this configuration of the points of the search space, $\alpha_{k,l,n,m}=\alpha_{k-n,\ l-m}$.

Then, the expression for the beamsteering vectors can be defined as:

$$\underline{a}_{k,l}^T=\left(e^{i2\pi\left(\frac{d_1}{\lambda}\right).k.\delta+\left(\frac{L_1}{\lambda}\right).l.\Delta},\ \ldots,\ e^{i2\pi\left(\frac{d_N}{\lambda}\right).k.\delta+\left(\frac{L_N}{\lambda}\right).l.\Delta}\right)$$

If we now consider the second look up table of $\alpha_{k,l,m,n}$ $$\begin{aligned}\alpha_{k,l,n,m}&=\frac{1}{N}(\underline{a}_{n,m}^H\ \ \underline{a}_{k,l})\\&=\frac{1}{N}\left(e^{i2\pi\left(\frac{d_1}{\lambda}\right).(k-n).\delta+\left(\frac{L_1}{\lambda}\right).(l-m).\Delta},\ \ldots,\ e^{i2\pi\left(\frac{d_N}{\lambda}\right).(k-n).\delta+\left(\frac{L_N}{\lambda}\right).(l-m).\Delta}\right)\\&=\alpha_{k-n,l-m}\end{aligned}$$

The spacing of points in a search grid for which this property holds is implicitly obtained if a (zero padded) 2D-FFT is used on the input dataset or "2D snapshot". However computing such a 2D FFT can be computationally inefficient. Therefore, in one or more examples, we propose to use a search grid for which the $\alpha_{k,l,m,n}=\alpha_{k-n,l-m}$ property holds, but we do not necessarily apply a 2D-FFT.

Evaluation of the objective function for all elements in the four-dimensional search space ($\Phi_1$; $\theta_1$; $\Phi_2$; $\theta_2$) results in a DML spectrum. The location of the maximum will be at location (k, l, n, m) . The indices tuple (k, l) corresponds to the first and second DoA angles and therefore the azimuth and elevation angles of the first target. The indices tuple (n, m) corresponds to the first and second DoA angles and therefore the azimuth and elevation angles of the second target.

The elevation angle of the first target is obtained using $\theta$=arccos(k. $\Delta$) after which the azimuth angle is obtained using $\phi$=arcsin(l. $\delta$/sin $\theta$).

The division in this expression is an additional non-linear operation besides the arcsin operation. From this we can conclude that derivation of $\theta$ from the DML spectrum is not dependent on an estimate of $\Phi$, which is a consequence of the definition of $\theta$ and $\Phi$.

For computational efficiency a look up table for $\alpha_{k,l,m,n}$ may be determined. It is recalled that the evaluation of the objective function:

$$f = \frac{1}{N\left(1 - |\alpha_{k,l,n,m}|^2\right)}\left(|y_{k,l}|^2 - 2\mathrm{Re}\{\alpha_{k,l,n,m} y_{k,l} y^*_{n,m}\} + |y_{n,m}|^2\right)$$

requires recall of $\alpha_{k,l,m,n}$. Thus, for the search for two targets, the apparatus 100 may configured to, prior to said search for the set of direction of arrival angles, determine the look up table, said look up table providing an evaluation, for different combinations of k, l, m and n, of:

$$\alpha_{k,l,n,m} = \frac{1}{N}\left(\underline{a}^H_{n,m}\ \ \underline{a}_{k,l}\right) = \alpha_{k-n,l-m}$$

wherein $\underline{\alpha}_{k,l}$ comprises the beamsteering vector for a first target of the plurality of targets;

wherein $$\underline{a}^H_{n,m}$$

comprises a Hermitian of the beamsteering vector for a second target of the plurality of targets, wherein k and l represents indices for stepping through the points of the search space corresponding to the first DoA angle and the second DoA angle respectively for the first target, wherein n and m represents indices for stepping through the points of the search space corresponding to the first DoA angle and the second DoA angle respectively for the second target, and wherein values of $\alpha_{k,l,m,n}$ are recalled from the look up table for the different combinations of k, l, m and n during said search for the set of the first and second DoA angles for each of the two targets wherein said objective function includes the term $\alpha_{k,l,m,n}$.

Figure 7:
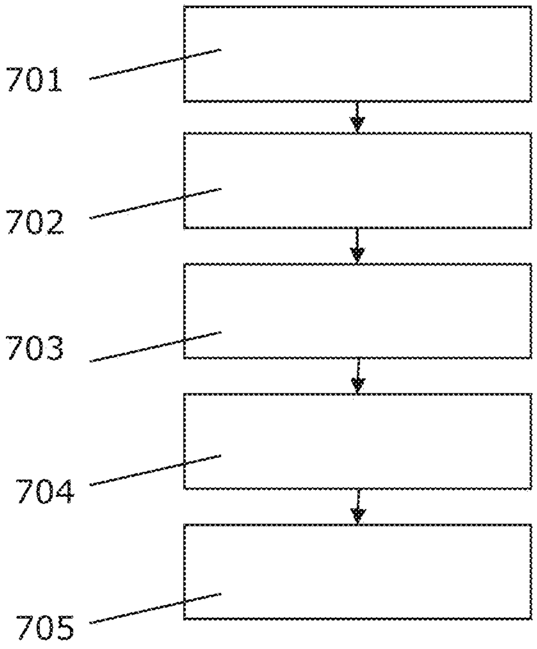
FIG. 7 shows an example flowchart illustrating a method.

Example FIG. 7 shows a flowchart illustrating a method for determining the directions of arrival angles for each of a plurality of targets, the method comprising:

receiving 701 an input dataset, $\underline{x}$, indicative of radar signals received at a plurality of antenna elements that are arranged in a first plane in a two-dimensional array, wherein the radar signals have reflected from a plurality of targets;

defining 702 a matrix, A, formed of beamsteering vectors, $\underline{a}$, comprising one for each one of the plurality of targets, each beamsteering vector representing an expected response at the plurality of antenna elements of the radar signals from the respective target with a predetermined amplitude and comprising a function of a first direction of arrival, DoA, angle $\theta$, relative to the plurality of antenna elements, and a second direction of arrival, DoA, angle $\Phi$, relative to the plurality of antenna elements, wherein the first DoA angle comprises a function of an elevation angle to the respective target and the second DoA angle comprises an azimuth angle to the respective target, wherein the azimuth angle lies in a second plane that is arranged perpendicular to the first plane;

defining 703 a signal amplitude vector, $\underline{s}$, to represent expected complex amplitudes of each of the plurality of targets as received in the radar signals;

defining 704 an objective function based on $\underline{x}$, A and $\underline{s}$;

searching 705 for a set of the first and second DoA angles for each of the plurality of targets by the repeated evaluation of the objective function over points of a search space, each point corresponding to a different combination of the first DoA angle and the second DoA angle, wherein said set of the first and second DoA angles comprise those that provides one of a maximum and a minimum evaluation of the objective function over the search space.

Figure 8:
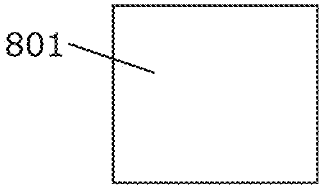
FIG. 8 shows an example computer readable medium.

FIG. 8 shows an example computer program product 801, such as a non-transitory computer program product, comprising computer program code which, when executed by the processor 102 of the apparatus 101 causes the apparatus 101 to perform the method described herein and as exemplified in FIG. 7.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising a processor configured to:

receive an input dataset, x, indicative of radar signals received at a plurality of antenna elements that are arranged in a first plane in a two-dimensional array, wherein the radar signals have reflected from a plurality of targets;

define a matrix, A, formed of beamsteering vectors, a, comprising one for each one of the plurality of targets, each beamsteering vector representing an expected response at the plurality of antenna elements of the radar signals from the respective target with a predetermined amplitude and comprising a function of a first direction of arrival, DoA, angle θ, relative to the plurality of antenna elements, and a second direction of arrival, DoA, angle Φ, relative to the plurality of antenna elements, wherein the first DoA angle comprises a function of an elevation angle to the respective target that includes the first DoA angle θ=an angle of the first plane−elevation angle and the second DoA angle comprises an azimuth angle to the respective target, wherein the azimuth angle lies in a second plane that is arranged perpendicular to the first plane and the elevation angle is measured from the second plane;

define a signal amplitude vector, s, to represent expected complex amplitudes of each of the plurality of targets as received in the radar signals;

define an objective function based on x, A and s;

search for a set of the first and second DoA angles for each of the plurality of targets by the repeated evaluation of the objective function over points of a search space, each point corresponding to a different combination of the first DoA angle and the second DoA angle, wherein said set of the first and second DoA angles comprise those that provides one of a maximum and a minimum evaluation of the objective function over the search space.

2. The apparatus of claim 1, wherein each of the beamsteering vectors are defined as:

$$\underline{a}_{k,l}^T = \left( e^{i2\pi\left(\frac{d_1}{\lambda}\right)sin\phi_k sin\theta_l + \left(\frac{L_1}{\lambda}\right)cos\theta_l}, \ldots, e^{i2\pi\left(\frac{d_N}{\lambda}\right)sin\phi_k sin\theta_l + \left(\frac{L_N}{\lambda}\right)cos\theta_l} \right)$$

wherein k and I are indices for stepping through the points in the search space that correspond to candidate first and second DoA angles respectively, $d_1$ to $d_N$ represent the spacing of respective ones of the plurality of antenna elements from a first reference antenna element of the plurality of antenna elements in a first direction, $L_1$ to $L_N$ represent the spacing of respective ones of the plurality of antenna elements from a second reference antenna element of the plurality of antenna elements in a second direction orthogonal to the first direction, λ represents the wavelength of the radar signals, $\theta_l$ comprises the first DoA angle at index l for a target of the plurality of targets, and $\Phi_k$ comprises the second DoA angle at index k for the target of the plurality of targets.

3. The apparatus of claim 1, wherein the points in the search space are arranged such that:

$\cos\theta_{l+1} - \cos\theta_l = \Delta$, wherein $\theta_l$ and $\theta_{l+1}$ are first DoA angles corresponding to all directly adjacent points in the search space and Δ comprises a first predetermined constant; and $$\sin\phi_{k+1}\sin\theta_l - \sin\phi_k\sin\theta_l = \delta;$$

wherein $\Phi_k$ and $\Phi_{k+1}$ are second DoA angles corresponding to all directly adjacent points in the search space and δ comprises a second predetermined constant.

4. The apparatus of claim 3, wherein each of the beamsteering vectors are $$\underline{a}_{k,l}^T = \left( e^{i2\pi\left(\frac{d_1}{\lambda}\right).k.\delta + \left(\frac{L_1}{\lambda}\right).l.\Delta}, \ldots, e^{i2\pi\left(\frac{d_N}{\lambda}\right).k.\delta + \left(\frac{L_N}{\lambda}\right).l.\Delta} \right)$$

wherein k and l are indices for stepping through the points of the search space that correspond to candidate first and second DoA angles respectively for each respective beamsteering vector.

5. The apparatus of claim 3, wherein, for the search for two targets, the apparatus is configured to, prior to said search for the set of direction of arrival angles, determine a look up table, said look up table providing an evaluation of:

$$\alpha_{k,l,m,n} = \frac{1}{N}\left(\underline{a}_{n,m}^H \ \underline{a}_{k,l}\right) = \alpha_{k-n,l-m}$$

wherein $a_{k,l}$ comprises the beamsteering vector for a first target of the plurality of targets;

wherein $$\underline{a}_{n,m}^H$$

comprises a Hermitian of the beamsteering vector for a second target of the plurality of targets, wherein k and l represents indices for stepping through the points of the search space corresponding to the first DoA angle and the second DoA angle respectively for the first target, wherein n and m represents indices for stepping through the points of the search space corresponding to the first DoA angle and the second DoA angle respectively for the second target, and wherein values of $\alpha_{k,l,m,n}$ are recalled from the look up table for the different combinations of k, l, m and n during said search for the set of the first and second DoA angles for each of the two targets wherein said objective function includes the term $\alpha_{k,l,m,n}$.

6. The apparatus of claim 1, wherein the plurality of targets comprises two targets.

7. The apparatus of claim 1, wherein the objective function is based on Q, wherein $Q=|x-As|^2$.

8. The apparatus of claim 1, wherein the input dataset is Range-Doppler processed such that it is one or both of representative of one or more targets located at a predetermined range of distances from the antenna elements; and one or more targets having a predetermined range of radial velocities relative to the antenna elements.

9. The apparatus of claim 1, wherein the apparatus comprises a frequency-modulated-continuous-wave, FMCW, radar system.

10. A method for determining the directions of arrival angles for each of a plurality of targets, the method comprising:

receiving an input dataset, x, indicative of radar signals received at a plurality of antenna elements that are arranged in a first plane in a two-dimensional array, wherein the radar signals have reflected from a plurality of targets;

defining a matrix, A, formed of beamsteering vectors, a, comprising one for each one of the plurality of targets, each beamsteering vector representing an expected response at the plurality of antenna elements of the radar signals from the respective target with a predetermined amplitude and comprising a function of a first direction of arrival, DoA, angle θ, relative to the plurality of antenna elements, and a second direction of arrival, DoA, angle Φ, relative to the plurality of antenna elements, wherein the first DoA angle comprises a function of an elevation angle to the respective target that includes the first DoA angle θ=an angle of the first plane–elevation angle and the second DoA angle comprises an azimuth angle to the respective target, wherein the azimuth angle lies in a second plane that is arranged perpendicular to the first plane and the elevation angle is measured from the second plane;

defining a signal amplitude vector, s, to represent expected complex amplitudes of each of the plurality of targets as received in the radar signals;

defining an objective function based on x, A and s;

searching for a set of the first and second DoA angles for each of the plurality of targets by the repeated evaluation of the objective function over points of a search space, each point corresponding to a different combination of the first DoA angle and the second DoA angle, wherein said set of the first and second DoA angles comprise those that provides one of a maximum and a minimum evaluation of the objective function over the search space.

11. The method of claim 10, wherein each of the beamsteering vectors are defined as:

$$\underline{a}_{k,l}^{T} = \left( e^{i2\pi\left(\frac{d_1}{\lambda}\right)sin\phi_k sin\theta_l + \left(\frac{L_1}{\lambda}\right)cos\theta_l}, \ldots , e^{i2\pi\left(\frac{d_N}{\lambda}\right)sin\phi_k sin\theta_l + \left(\frac{L_N}{\lambda}\right)cos\theta_l} \right)$$

wherein k and l are indices for stepping through the points in the search space that correspond to candidate first and second DoA angles respectively, $d_1$ to $d_N$ represent the spacing of respective ones of the plurality of antenna elements from a first reference antenna element of the plurality of antenna elements in a first direction, $L_1$ to $L_N$ represent the spacing of respective ones of the plurality of antenna elements from a second reference antenna element of the plurality of antenna elements in a second direction orthogonal to the first direction, λ represents the wavelength of the radar signals, $\theta_l$ comprises the first DoA angle at index l for a target of the plurality of targets, and $\Phi_k$ comprises the second DoA angle at index k for the target of the plurality of targets.

12. The method of claim 10, wherein the points in the search space are arranged such that:

$\cos\theta_{l+1}-\cos\theta_l=\Delta$, wherein $\theta_l$ and $\theta_{l+1}$ are first DoA angles corresponding to all directly adjacent points in the search space and Δ comprises a first predetermined constant; and $$\sin\phi_{k+1}\sin\theta_l-\sin\phi_k\sin\theta_l=\delta;$$

wherein $\Phi_k$ and $\Phi_{k+1}$ are second DoA angles corresponding to all directly adjacent points in the search space and δ comprises a second predetermined constant.

13. The method of claim 12, wherein each of the beamsteering vectors are defined as:

$$\underline{a}_{k,l}^{T} = \left( e^{i2\pi\left(\frac{d_1}{\lambda}\right).k.\delta + \left(\frac{L_1}{\lambda}\right).l.\Delta}, \ldots , e^{i2\pi\left(\frac{d_N}{\lambda}\right).k.\delta + \left(\frac{L_N}{\lambda}\right).l.\Delta} \right)$$

wherein k and l are indices for stepping through the points of the search space that correspond to candidate first and second DoA angles respectively for each respective beamsteering vector.

14. The method of claim 12, wherein, for the search for two targets, the method comprises, prior to said search for the set of direction of arrival angles, determining a look up table, said look up table providing an evaluation of:

$$\alpha_{k,l,n,m} = \frac{1}{N}\left(\underline{a}_{n,m}^{H}\ \underline{a}_{k,l}\right) = \alpha_{k-n,l-m}$$

wherein $a_{k,l}$ comprises the beamsteering vector for a first target of the plurality of targets;

wherein $$\underline{a}_{n,m}^{H}$$

comprises a Hermitian of the beamsteering vector for a second target of the plurality of targets, wherein k and l represents indices for stepping through the points of the search space corresponding to the first DoA angle and the second DoA angle respectively for the first target, wherein n and m represents indices for stepping through the points of the search space corresponding to the first DoA angle and the second DoA angle respectively for the second target, and wherein values of $\alpha_{k,l,m,n}$ are recalled from the look up table for the different combinations of k, l, m and n during said search for the set of the first and second DoA angles for each of the two targets wherein said objective function includes the term $\alpha_{k,l,m,n}$.

15. The method of claim 10, wherein the plurality of targets comprises two targets.

16. The method of claim 10, wherein the objective function is based on Q, wherein $Q=|x-As|^2$.

17. The method of claim 10, wherein the input dataset is Range-Doppler processed such that it is one or both of representative of one or more targets located at a predetermined range of distances from the antenna elements; and one or more targets having a predetermined range of radial velocities relative to the antenna elements.

18. A non-transitory computer program product comprising computer program code which, when executed by a processor of an apparatus provides the method of claim 10.

* * * * *